United States Patent Office 3,784,598
Patented Jan. 8, 1974

3,784,598
PROCESS FOR THE CONVERSION OF A 3-HY-DROXY-5,6-OXIDO GROUP OF A STEROID INTO A Δ⁴-3-OXO GROUP
Percy L. Julian and Arnold Hirsch, Oak Park, Ill., and Ernst Iseli, Basel, Switzerland, assignors to Ciba Corporation, Summit, N.J.
No Drawing. Continuation of abandoned application Ser. No. 818,434, Apr. 22, 1969. This application Jan. 20, 1972, Ser. No. 219,544
Int. Cl. C07c 173/00
U.S. Cl. 260—239.55 D          31 Claims

ABSTRACT OF THE DISCLOSURE

The present invention is concerned with the conversion of a 3-hydroxy-5,6-oxido group of a steroid, and more especially of a 3-hydroxy-5α,6α-oxido group of a steroid of the pregnane series, into a Δ⁴-3-oxo group. A process for a conversion of this kind is of special value for the manufacture of known progestatives such as 17α-hydroxy-progesterone, corticoids such as cortexolone, cortisone, hydrocortisone, triamcinolone, dexamethasone, betamethasone and fluprednylidene and their derivatives, from starting materials of the pregnenolone type which themselves are obtained in good yield and economically from diosgenin.

This application is a continuation of Ser. No. 818,434, filed Apr. 22, 1969 and now abandoned.

BACKGROUND OF THE INVENTION

The introduction of the 17α-hydroxyl group into the said starting materials is advantageously carried out by peracid oxidation of the Δ¹⁷,²⁰-enolesters and subsequent hydrolysis of the 17,20-oxido-20-acyloxy compounds. During this, the 5,6-double bond needed temporary protection since otherwise the peracid treatment would cause the formation of a 5,6-oxido group in the 5,6-position which remains intact and is then not easy to eliminate. Such a protection of the 5,6-double bond was achieved in the past mainly by the following methods:

(a) Addition of bromine on to the 5,6-double bond with formation of the 5,6-dibromo compound (cf. U.S.A. specification 3,187,025).

(b) Addition of chlorine on to the 5,6-double bond with formation of the 5,6-dichloro compound (cf. U.S.A. specification 3,030,389).

(c) Conversion of the Δ⁵-3-hydroxyl group into a 3,5-cyclo - 6 - alkoxy - steroid (cf. U.S.A. specification 3,231,568).

From these protective groups the 5,6-double bond in (a) and (b) can be regenerated by reduction with metals, for example zinc and acetic acid, or with sodium iodide in acetone and, in the case of (c), by treatment with an acid.

According to the present invention it is not necessary to protect the 5,6-double bond by one of these methods but 5α,6α-oxido compounds, which are preferably formed in the direct peracid oxidation, or which are obtained in known manner from the epimer mixture of the 5α,6α- and 5β,6β-epoxides, can be used directly for the further processing, since a method has now been found to eliminate the said oxido group easily and with good yields, accompanied by formation of a Δ⁴-3-oxo group.

SUMMARY OF THE INVENTION

The process of this invention is characterized in that a 3 - hydroxy-5α,6α-oxidopregnane compound is treated with 1 mol equivalent of hydrogen iodide, the resulting 3-hydroxy-6β,5α-iodohydrin is oxidized in the 3-position to form the corresponding 3-oxo-6β,5α-iodohydrin and the latter compound is treated with a member selected from the group consisting of a dehydrating agent capable of converting a 3-oxo-5α-hydroxy group of a steroid into the Δ⁴-3-oxo group, and a reducing agent capable of converting a halohydrin into an olefin and any Δ⁴-6-iodo-3-oxo-compound formed is deiodinated and any Δ⁵-3-oxo-compound is isomerized to the Δ⁴-3-oxo-compound and, if desired, any functionally converted hydroxy or oxo groups are liberated and/or any free hydroxyl group is functionally converted.

PREFERRED EMBODIMENTS OF THE INVENTION

In the new method of the present process the oxidation with chromic acid at the 5α,6β-iodohydrin stage proceeds very well and in the 3-oxo-5α-hydroxy-6β-iodo compound the hydroxy group and the iodine atom are very easy to eliminate with formation of the Δ⁴-3-oxo group.

The treatment according to this invention of the starting materials with hydriodic acid is carried out at a low temperature, for example at about 0° C. The solvent used must be inert towards hydriodic acid as well as to the subsequent oxidation, for example a hydrocarbon, especially a chlorinated hydrocarbon such as methylenechloride or ethylenechloride. The hydriodic acid is preferably used in the form of an aqueous solution of about 55% strength thereof. The iodohydrin is generally obtained in form of a gelatinous substance. For the oxidation it is mixed with acetone in the same solvent without isolation and then treated with chromium trioxide+sulphuric acid (Jones' reagent).

The elimination of the hydroxyl group in the 5α-position and of the iodine atom in 6β-position may be achieved in successive steps or in one single step, depending on the type of dehydrating agents or reducing agents.

Dehydrating agents to be used according to the process of the invention are such as are capable of converting a 3-oxo-5α-hydroxy group of a steroid into the Δ⁴-3-oxo group and such agents are primarily acids, preferably hydrohalic acids, such as hydrochloric, hydrobromic and hydriodic acid. When these acids are used in concentrated form and especially in the presence of certain solvents, such as glacial acetic acid, the elimination of the hydroxyl group in 5-position and of iodine substantially occurs simultaneously with the formation of the desired Δ⁴-3-oxo-steroid. The reaction may be carried out in the same solvent as has been used for the extraction of the 3-oxo-6β,5α-iodohydrin, for instance methylene chloride, if desired, with addition of other solvents, such as acetic acid. It is however advantageous to further treat the reaction product so obtained with a reducing agent capable of reducing iodine to hydriodic acid or a salt thereof. As such reducing agents there are preferably used sodium bisulfite, sodium thiosulfate or sodium hyposulfite. For carrying out this treatment it is of advantage to use the product in the solvent used in the hydrohalic acid treatment, for instance methylene chloride; this solution is washed with water and shaken with a 10% aqueous solution of sodium bisulfite, whereupon the end product is produced in what might be considered a one pot process.

Treatment with hydrogen iodide in glacial acetic acid is especially advantageous in that the final product is purer.

If a dehydrating agent is used which does not eliminate the 6-iodo-atom from the steroid elimination of the iodine from the obtained Δ⁴-6-iodo-3-oxo-steroids is effected in a second step. Such deiodination is effected e.g. in a manner known per se, for instance by treatment with sodium bisulfite or sodium iodide, stannous chloride, a chromous salt, or by any equivalent process.

The elimination of the hydroxyl group in 5-position and of the iodine atom in 6-position in the 3-oxo-6β,5α-iodohydrins may also be effected by treatment with a reducing agent capable of converting a halohydrin into the corresponding olefin, e.g. metals, such as zinc, copper or zinc-copper alloys, in the presence of an acid, such as acetic acid or an alcohol, e.g. ethanol or methanol. When an acid is used, there is obtained directly the desired Δ⁴-3-ketone; under neutral conditions there is obtained the Δ⁵-3-ketone, which is then isomerized in known manner, e.g. with an acid to the Δ⁴-3-ketone.

The process and the manufacture of the starting material can be illustrated by the following scheme of reactions showing the synthesis of cortexolone from pregnenolone acetate:

When Compound 5 is used instead of 6 as starting material, the final product is 17α-hydroxyprogesterone.

The starting materials (5) or (6) can be obtained from the mixtures of the 5α,6α- and 5β,6β-oxidosteroids prepared as indicated above in known manner, for example by the usual physical methods such as crystallization or chromatography or, with special advantage, by the process claimed in U.S.A. specification 3,081,297. By the last-mentioned process it is possible to convert the mixture of the epoxides, as is formed on peracid oxidation, into the 5α,6α-epoxide in a good yield. It is based on the conversion of the 5β,6β-epoxide present in the mixture into the 5α,6α-epoxide during the treatment of the mixture with a mineral acid containing oxygen, esterification of the 6-hydroxyl group in the unitary 5α,6β-dihydroxy com-

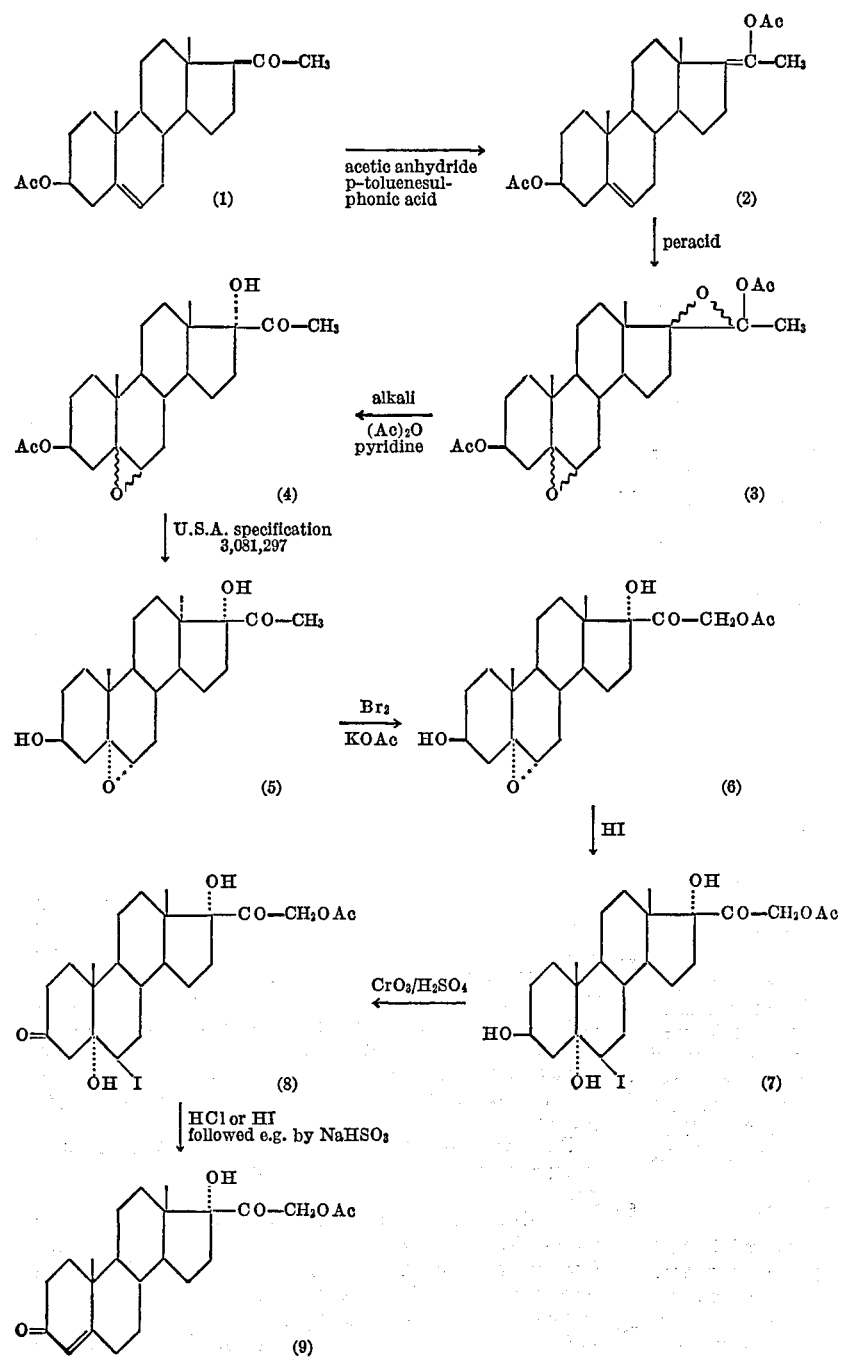

pound formed and treatment of the ester with an alkaline reagent.

Every single step (6) to (9) of the present process or corresponding steps in the sequence starting from (5) can be carried out with good yields, especially also the oxidation of iodohydrin (7) to (8). Thus, the use of the new process for the synthesis of corticoids according to the above scheme has not only the advantage that to introduce the 17α-hydroxyl group with peracids the 5,6-double bond need not necessarily be specially protected because the 5,6-oxido group is easy to eliminate at the end, but also the advantage that the Δ⁵-3-hydroxyl group can be oxidized in good yield to the Δ⁴-3-ketone via the corresponding 3-hydroxy-5α,6α-epoxide. It is known that in the past this step always caused difficulties. The direct oxidation with chromic acid+sulphuric acid gives good yields, the Oppenauer method cannot be used in the presence of a dihydroxyacetone side-chain, and microbiological oxidation may often be undesirable from the standpoint of large scale manufacture. It appears that the best results in chemical dehydrogenation are obtained by a modification of the oxidation with Jones' reagent in which the 5,6-double bond is brominated in pyridine and oxidized with chromium trioxide+sulphuric acid in the same solvent. However, this oxidation must be followed by a reduction with zinc+acetic acid so as to remove again the bromine added on to the double bond for intermediate protection.

The starting materials to be used in the present process may be any desired 3-hydroxy-5α,6α-oxidosteroids of the pregnane series; they may contain further substituents such as alkyl groups, especially methyl groups, halogen atoms, further oxido groups, free or functionally modified hydroxyl, amino or oxo groups. Preferred starting materials are the 3,17-dihydroxy-5α,6α-oxidosteroids of the following formula

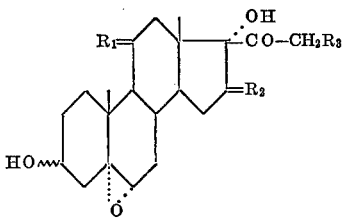

in which $R_1$ represents two hydrogen atoms, or a free hydroxyl group together with a hydrogen atom, or an oxo group; $R_2$ represents two hydrogen atoms, or a hydrogen atom together with an α- or β-alkyl group, especially a methyl group, or with an esterified or etherified α-hydroxyl group, or an alkylene group, especially a methylene group, and $R_3$ represents hydrogen or an esterified or etherified hydroxyl group, and derivatives of these compounds, for example 17-monoesters or derivatives of 16,17-dihydroxy compounds containing the ring D of the following partial formula

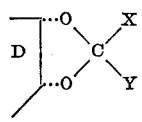

in which X and Y represent two hydrocarbon residues which may be unsubstituted or substituted, for example, by hydroxyl groups, acyloxy groups or free or esterified carboxyl groups. The said esterified hydroxyl groups are in the first place those which are esterified with a lower aliphatic carboxylic acid, for example acetic or propionic acid. Etherified hydroxyl groups are especially those etherified with a lower aliphatic alcohol, for example methanol or ethanol, or with benzyl alcohol or tetrahydropyranol.

The conversion of protected, that is functionally modified hydroxyl or oxo groups, for instance esterified or etherified hydroxyl group into the corresponding free groups is carried out in a manner known per se, for instance by alkaline or acid hydrolysis or by reduction. Also the functional conversion of hydroxyl groups, for instance esterification or etherification, is effected e.g. according to standardized methods.

The starting materials are known or, insofar as they are new, they can be manufactured, for example, as described above.

The 6β,5α-iodohydrins materializing in the course of the process are new and are likewise included in this invention. Special mention deserve the 3,5α-dihydroxy-6β-iodosteroids of the pregnane series and the 3-oxo-5α-hydroxy-6β-iodosteroids of the pregnane series, for example the compounds of the formula

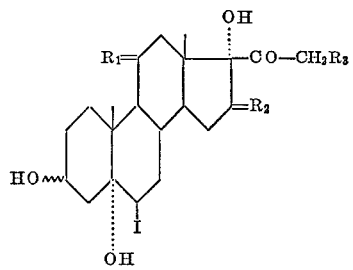

and of the formula

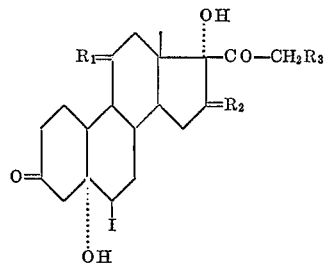

in which $R_{1-3}$ have the above meanings and $R_2$ and $R_3$ may also be free hydroxyl groups together with hydrogen or free hydroxyl groups, respectively, and their derivatives esterified in the 17α-position or derivatives of 16,17-dihydroxy compounds of the above partial formula of ring D, for example the 21-acetates of 6β-iodo-3β,5α,17α, 21-tetrahydroxy-20-oxopregnane and 16α-methyl-6β-iodo-3β,5α,17α,21-tetrahydroxy-20-oxopregnane, as well as the corresponding 11β-hydroxy and 11-oxo derivatives; 6β-iodo-3β,5α,17α-trihydroxy-20-oxopregnane, 6β-iodo-16α-methyl-3β,5α,17α-trihydroxy-20-oxopregnane; the 21-acetates of 6β-iodo-5α,17α,21-trihydroxy-3,20-dioxopregnane and 6-iodo-16α-methyl-5α,17α,21-trihydroxy - 3,20 - dioxopregnane and their 11-hydroxy and 11-oxo-derivatives; 6β-iodo-5α,17α-dihydroxy-3,20-dioxopregnane and 6β-iodo-16α-methyl - 5α,17α - dihydroxy-3,20-dioxopregnane.

The invention includes also any variant of the process in which an intermediate obtained at any stage of the process is used as starting material and any remaining step(s) is/are carried out or the process is discontinued at any stage thereof, or in which a starting material is formed under the reaction conditions.

The following examples illustrate the invention.

EXAMPLE 1

A soluton of 5 g. of 3β-hydroxy-17α-acetoxy-5α,6α-oxido-20-oxopregnane in 25 ml. of methylene chloride is cooled to 0° C., and 1.7 ml. of 57% aqueous hydriodic acid were dropped in. The mixture is stirred for 10 minutes, whereupon a solid substance settles out, and 1 ml. of 10% sodium bisulphite is added. The colorless crystalline precipitate is suctioned off, washed with a small quantity of cold methylenechlorde and with water and then dried. The product is 3β,5α-dihydroxy-17α-acetoxy-6β-iodo-20-oxopregnane which melts at 100–101° C. with decomposition.

The iodohydrin is dissolved in 100 ml. of acetone and the solution cooled to 0° C. Then 3.2 ml. of Jones' reagent are added and the mixture is stirred for 10 minutes and then diluted with 500 ml. of water. The colorless crystalline precipitate is suctioned off, thoroughly washed with water and dried. The yield of the resulting 5α-hydroxy-17α-acetoxy-6β-iodo-3,20-dioxopregnane amounts to 5 g.; it melts at 104–110° C. with decomposition.

The resulting 3-oxo-iodohydrin is dissolved in 50 ml. of methylenechloride and hydrogen chloride gas is injected into this solution for 15 minutes. The dark red solution is then stirred for 1 hour, and 25 ml. of 10% sodium bisulphite solution are added. The mixture is stirred for 1 hour, then the methylene-chloride washed with 2×50 ml. of water and evaporated under vacuum. The residue is recrystallized from acetone and yields 3.2 g. of 17α-acetoxyprogesterone melting at 238–242° C.

Example 2

A suspension of 6 g. of the 21-acetate of 3β,17α,21-trihydroxy-5α,6α-oxido-20-oxopregnane in 60 ml. of tetrahydrofuran is cooled to 0° C., and 1.95 ml. of 57% aqueous hydroiodic acid are dropped in. The solution thus formed is stirred for 10 minutes and the tetrahydrofuran is then evaporated under vacuum. The solution is mixed with 120 ml. of acetone and cooled to 0° C., and 3.75 ml. of Jones' reagent are added. The solution is stirred for 10 minutes, whereupon a thick crystalline precipitate forms after 2 minutes. The suspension is diluted with 1 liter of water and the colorless product is suctioned off and dried. The product is the 21-acetate of 5α,17α,21-trihydroxy-6β-iodo-3,20-dioxopregnane melting at 143–145° C. with decomposition.

The 3-oxo-iodohydrin is dissolved in 60 ml. of methylenechloride and 60 ml. of glacial acetic acid. The mixture is saturated with hydrogen chloride gas and stirred for 1 hour, then 25 ml. of 10% sodium bisulphite solution are added and the mixture is stirred for 1 hour. Then 60 ml. of methylenechloride are added, the organic phase is thoroughly washed with water and evaporated under vacuum. The residue is recrystallized from acetone and yields 4.5 g. of cortexolone acetate melting at 230–231° C.

EXAMPLE 3

A suspension of 7.24 g. of 16α-methyl-5α,6α-oxido-3β,17α-dihydroxy-20-oxopregnane in 35 ml. of methylenechloride is cooled to 0° C., and 2.6 ml. of 57% aqueous hydriodic acid are dropped in. The mixture is stirred for 5 minutes, then 1 ml. of 10% sodium bisulphite solution is added and the suspension is suctioned. The iodohydrin is thoroughly washed with water; since it decomposes very rapidly, it is immediately oxidized as follows: It is dissolved in 200 ml. of acetone, the solution cooled to 0° C., treated with 5 ml. of Jones' reagent and stirred for 10 minutes, diluted with 500 ml. of water and suctioned, to yield 9 g. of 16α-methyl-5α,17α-dihydroxy-6β-iodo-3,20-dioxopregnane melting at 149–153° C. with decomposition.

The iodohydrin thus obtained is suspended in 100 ml. of methylenechloride and 60 ml. of glacial acetic acid. Hydrogen chloride gas is passed through the solution, whereupon all dissolves. The mixture is stirred for 2 hours, the red solution is mixed with 35 ml. of 10% sodium bisulphite solution and stirred for 1 hour, whereupon the red color disappears. The methylenechloride layer is washed with water, adjusted to a pH value of 8 with 1% sodium hydroxide solution, then adjusted with water to pH 7 and evaporated under vacuum.

The residue is dissolved in 20 ml. of acetone and the solution is cooled, whereupon 3.5 g. of handsome prisms of 16α-methyl-17α-hydroxy-progesterone, melting at 180–182° C., are obtained.

EXAMPLE 4

While cooling in an ice bath a solution of 8.4 g. of the 21-acetate of 3β,17α,21 - trihydroxy-5α,6α-oxido-16α-methyl-20-oxopregnane in 40 ml. of methylenechloride, 2.6 ml. of 57% hydriodic acid (1 mol equivalent) are added dropwise. The mixture solidifies to form a gel which is mixed with 160 ml. of acetone, whereupon the gel dissolves again. After cooling to 5° C., 6 ml. of Jones' reagent (8 N-chromium trioxide solution) are added in a continuous jet, whereupon the temperature rises to 15° C. The mixture is cooled and stirred for 10 minutes and then 150 ml. of water are added. The layers are separated and the aqueous layer is washed with another 100 ml. of methylenechloride. Then 10 ml. of glacial acetic acid are added to the methylenechloride solution, and hydrogen chloride gas is passed through this solution for 15 minutes at 15° C. On completion of the gassing the mixture is stirred on for 45 minutes. Then 100 ml. of 10% sodium bisulphite solution are added and the batch is stirred on for 1 hour, during which a colorless mixture forms. The methylenechloride phase is drawn off and washed with 2× 100 ml. of water and then with another 50 ml. of water. The combined extracts are evaporated under vacuum to leave an oily residue which on recrystallization from 35 ml. of acetone furnishes 6.7 g. of the 21-acetate of 16α-methyl-cortexolone melting at 163–165° C.

EXAMPLE 5

To a solution of 12.6 g. of the 21-acetate of 16α-methyl - 5α,6α - oxido - 3β,17α,21 - trihydroxy-20-oxopregnane in 60 ml. of methylenechloride, cooled to 0° C., there are added dropwise 3.7 ml. of aqueous 57% hydriodic acid. The mixture is stirred for 5 minutes, whereupon a crystalline precipitate settles out. Then 1 ml. of 10% sodium bisulphite solution is added and the colorless product suctioned off, thoroughly washed with water and dried. The crude 21-acetate of 16α-methyl-6β-iodo-3β,5α,17α,21 - tetrahydroxy - 20 - oxopregnane melts at 117–118° C. (with decomposition).

The iodohydrin is dissolved in 24 ml. of acetone, the solution cooled to 0° C. and 10 ml. of Jones' reagent are introduced in a continuous jet, during which the temperature rises to 7° C. The mixture is stirred for 5 minutes, then diluted with 1600 ml. of water, suctioned off and the filter cake is dried. The crude 21-acetate of 16α - methyl - 6β - iodo - 5α,17α,21 - trihydroxy-3,20-dioxopregnane (14 g.) melts at 118–122° C. with decomposition.

The 3-oxo-iodohydrin obtained is dissolved in 400 ml. of methylenechloride and 10 ml. of glacial acetic acid. Hydrogen chloride gas is introduced into the mixture to saturation and the whole is stirred for 1 hour. Then 100 ml. of 10% sodium bisulphite solution are added and the whole is stirred for 1 hour. The colorless organic layer is separated, throughly washed with water and evaporated under vacuum. The residue is recrystallized from acetone, to furnish 9 g. of the 21-acetate of 16α - methyl - cortexolone melting at 160–163° C.

EXAMPLE 6

To a solution of 4.04 g. of the 16,17-acetonide of 3β,16α,17α-trihydroxy-5α,6α-oxido-20-oxopregnane in 20 ml. of methylenechloride, cooled to 0° C., there are added dropwise 1.3 ml. of 57% aqueous hydriodic acid. The mixture is stirred for 5 minutes, mixed with 1 ml. of 10% sodium bisulphite solution and neutralized with solid sodium carbonate. The colorless product is suctioned off, washed with water and dried, to yield 5 g. of the 16,17-acetonide of 3β,5α,16α,17α - tetrahydroxy - 6β-iodo - 20-oxopregnane melting at 106–108° C. with decomposition. To purify the product it is recrystallized from acetone.

2 grams of the iodohydrin thus obtained are dissolved in 20 ml. of acetone. The solution is cooled to 0° C., and 0.95 ml. of Jones' reagent are added. It is stirred for 5 minutes, diluted with 200 ml. of water and extracted with 50 ml. of methylenechloride. The methylenechloride layer is saturated with hydrogen chloride gas and stirred for 1 hour at room temperature. Then 20 ml. of 10% sodium bisulphite solution are added and the whole is stirred for 1 hour. The organic phase is separated, thoroughly washed with water and evaporated under vacuum. The residue is recrystallized from acetone and yields 1.4 g. of the 16,17-acetonide of 16α,17α-dihydroxy-progesterone melting at 213–216° C.

EXAMPLE 7

While cooling in an ice bath a suspension of 25.2 g. of the 21-acetate of 3β,17α,21 - trihydroxy-5α,6α-oxido-16α-methyl-20-oxopregnane in 120 ml. of methylene chloride, 8 ml. of 57% hydriodic acid (1 mol equivalent) are added dropwise. In a few minutes after all of the hydriodic acid has been added, complete solution ensues. The solution is reddish-orange in color. The solution has a temperature of ca. 3–5° C. With continued stirring the mixture soon solidifies to form a thick crystalline mass of the iodohydrin. 400 ml. of acetone are added, whereupon solution again occurs. To this solution at ca. 20° C., 32 ml. of Jones' reagent (8 N chromic acid solution) is added in a continuous jet, whereupon the temperature rises to about 37° C. The mixture is stirred for 20 minutes during which (without heating) the temperature of the reaction remains at ca. 35° C. 1400 ml. of water are then added. The green aqueous layer is extracted with first, 200 ml. (volume of lower layer=ca. 510 ml.) methylene chloride, and a second time with 100 ml. methylene-chloride (volume of lower layer=ca. 150 ml.). The combined almost colorless methylene chloride layers are washed with 500 ml. water and evaporated in vacuo. The residue is taken up in 240 ml. glacial acetic acid, 25 ml. of 57% hydriodic acid added, and the resulting red-colored mixture is stirred for 2 hours. It is then diluted with 200 ml. methylene chloride and extracted with 1 liter of water. The organic phase is separated and the aqueous layer back-washed with three 100 ml. portions of methylene chloride. The methylene chloride layers (purple in color) are washed with water and stirred for ½ hour with 100 ml. 10% sodium bisulfite. The colorless organic layer is separated, washed with water and evaporated in vacuo to a solid residue. The residue is dissolved with warming in 25 ml. pyridine and 25 ml. acetic anhydride, and the resulting solution allowed to stand for 18 hours. It is then poured into 250 ml. of water containing 25 ml. conc. hydrochloric acid. The mixture is stirred for 2 hours and filtered. The colorless product is washed well with water and dried. The crude 21-acetate of 16α-methyl-cortexolone, melting at 157–62° C., weighed 21.5 g. Recrystallization from isopropyl alcohol gives 20 g. of essentially pure material with a M.P. of 160–64° C. A second crop of ½ g. is obtained, bringing the total yield to 85% of theory.

EXAMPLE 8

While cooling in an ice bath (0°) a suspension of 25 g. of the 21-acetate of 3β,17α,21-trihydroxy-5α,6-oxido-16α-methyl-20-oxopregnane in 30 ml. of methylene chloride, 8.8 ml. of 57% hydriodic acid (1.1 mol equivalents) is added thereto dropwise. In a few minutes after all of the hydriodic acid has been added, complete solution ensues. The solution is reddish-brown in color and has a temperature at this point of 3–5° C. With continued stirring, the mixture soon solidifies to form a thick crystalline mass of the iodohydrin. 400 ml. of acetone is added, whereupon solution again occurs. To this solution at ca. 20° C., 32 ml. of Jones' reagent (8 N chromic acid, $CrO_3$) is added in a continuous jet, whereupon the temperature rises to about 37° C. The mixture is stirred for 20 minutes during which (without heating) the temperature of the reaction remains at ca. 35° C. 1600 ml. of water is then added. The green aqueous layer is extracted with first, 300 ml. of methylene chloride, and a second time with 200 ml. of methylene chloride. The combined almost colorless methylene chloride layers are washed with 500 ml. of water and evaporated in vacuo. The residue is taken up in 250 ml. of methylene chloride, and 100 ml. of glacial acetic acid added. To this mixture 48 ml. of 57% hydriodic acid are added and the red-colored aggregate stirred for 2 hours at ca. 27° C. It is then diluted with 500 ml. of water and 100 ml. of 10% sodium bisulfite are added. The mixture is stirred for ½ hour at ca. 27° C. and the organic layer is separated, diluted with 100 ml. of methylene chloride, and washed consecutively with 200 ml. of water, 250 ml. of 2% potassium bicarbonate (to pH 8) and 100 ml. of water (to pH 7). The methylene chloride layer is evaporated in vacuo, and the residue is crystallized from 175 ml. of isopropyl alcohol to yield 21.5 g. of 16α-methyl-cortexolone acetate (90% yield) with a M.P. 158°/162–165° C.

A second crystallization from 140 ml. isopropyl alcohol yields a first crop of 20 g. (83.5% of theory) of essentially pure 16α-methyl-cortexolone acetate with a M.P. 161—165° C.

What is claimed is:
1. A process for converting a 3-hydroxy-5α,6α-oxido group of a steroid of the pregnane series into a Δ⁴-3-oxo group, characterized in that a 3-hydroxy-5α,6α-oxidiopregnane compound is treated with 1 mol equivalent of hydrogen iodide, the resulting 3-hydroxy-6β,5α-iodohydrin is oxidized with chromic acid in the 3-position to form the corresponding 3-oxo-6β,5α-iodohydrin and the latter compound is treated with a member selected from the group consisting of an acid as a dehydrating agent capable of converting the 3-oxo-5α-hydroxy group of a steriod into the Δ⁴-3-oxo group, and a metal as a reducing agent capable of converting a halohydrin into an olefin, and any Δ⁴-6-iodo-3-oxo-compound formed is deiodinated with a member selected from the group of sodium bisulphite, sodium iodide, stannous chloride and a choromous salt, and any Δ⁵-3-oxo-compound is isomerized with an acid to the Δ⁴-3-compound.

2. A process according to claim 1, characterized in that the treatment of the starting material with hydrogen iodide is carried out at a low temperature in an inert solvent.

3. A process according to claim 2, characterized in that a chlorinated hydrocarbon is used as solvent.

4. A process according to claim 3, wherein methylenechloride is used as solvent.

5. A process according to claim 2, characterized in that the treatment with hydrogen iodide is carried out at about 0° C.

6. A process according to claim 2, wherein the hydrogen iodide is used in form of an aqueous solution of about 55% strength.

7. A process according to claim 1, characterized in that the 3-hydroxy-6β,5α-iodohydrin is oxidized in position 3 with Jones' reagent to form 3-oxo-6β,5α-iodohydrin.

8. A process according to claim 7, wherein the oxidation is carried out in the presence of the same solvent as has been used for the manufacture of the 3-hydroxy-6β,5α-iodohydrin.

9. A process according to claim 1, characterized in that there is used a hydrohalic acid as an acid dehydrating the 3-oxo-5α-hydroxy group of a steroid into the Δ⁴-3-oxo group.

10. A process according to claim 9, wherein there is used a hydrohalic acid.

11. A process according to claim 9, wherein there is used a member selected from the group consisting of hydrochloric, hydrobromic and hydoiodic acid.

12. A process according to claim 9, wherein there is used a member selected from the group consisting of hydrochloric, hydrobromic and hydriode acid in the presence of glacial acetic acid.

13. A process according to claim 12, wherein the treatment with the hydrohalic acid is followed by a treatment with a reducing agent capable of reducing iodine to hydriodic acid.

14. A process according to claim 13, wherein there is used sodium bisulfite as the reducing agent capable of reducing iodine to hydriodic acid.

15. A process according to claim 13, wherein there is used thiosulfate as the reducing agent capable of reducing iodine to hydriodic acid 16. A process according to claim 13, wherein there is used hydroiodic acid of about 55% strength in the presence of glacial acetic acid and the reaction product is treated with a member selected from the group consisting of aqueous sodium bisulfite and thiosulfate solution.

17. A process according to claim 1, wherein any $\Delta^{4\text{-}6}$-iodo-3-oxo-steroid obtained with a dehydrating agent is deiodinated by treatment with a member selected from the group consisting of sodium bisulfite, stannous chloride, a chromous salt and sodium iodide.

18. A process according to claim 1, wherein zinc in the presence of acetic acid or an alcohol is used as an agent capable of converting a halohydrin into an olefin.

19. A process according to claim 18, wherein there is used zinc in the presence of acetic acid.

20. A process according to claim 1, wherein there is used a metal in the presence of an alcohol as an agent capable of converting a halohydrin into an olefin.

21. A process according to claim 20, wherein there is used zinc in the presence of an alcohol.

22. A process according to claim 12, wherein methylenechloride is used as solvent.

23. A process according to claim 14, wherein sodium bisulphite is used as an aqueous solution of 10% strength.

24. A process according to claim 1, wherein starting materials are used selected from the group consisting of a compound of the formula

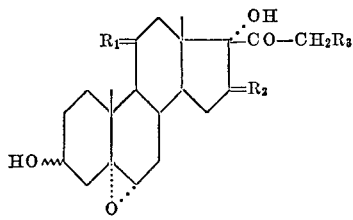

in which $R_1$ represents a member selected from the group consisting of two hydrogen atoms, a free hydroxyl group together with a hydrogen atom, and an oxo group; $R_2$ represents a member selected from the group consisting of 2 hydrogen atoms, a hydrogen atom together with an $\alpha$-alkyl group, and a hydrogen atom with a $\beta$-alkyl group; a hydrogen atom with a member selected from the group consisting of $\alpha$-hydroxyl group esterified with lower aliphatic carboxylic acid and etherified with lower aliphatic alcohol, benzyl alcohol or tetrahydropyranol, methylene group, and $R_3$ represents a member selected from the group consisting of hydrogen, hydroxyl group esterified with lower aliphatic carboxylic acid and etherified with lower aliphatic alcohol, benzyl alcohol or tetrahydropyranol, 17-monoesters with lower aliphatic carboxylic acid and derivatives of 16,17-dihydroxy compounds with the following partial formula of ring D

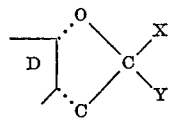

in which X and Y represents each member selected from the group consisting of an unsubstituted hydrocarbon residue and a hydrocarbon residue substituted by a member selected from the group consisting of acyloxy groups and esterified carboxyl groups.

25. A member selected from the group consisting of a compound of the formula

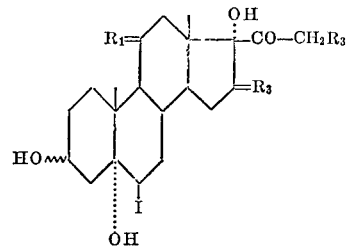

in which $R_1$ represents a member selected from the group consisting of two hydrogen atoms, a free hydroxyl group together with a hydrogen atom, and an oxo group, $R_2$ a member selected from the group consisting of two hydrogen atoms, 1 hydrogen atom together with an $\alpha$-alkyl group, 1 hydrogen atom together with a $\beta$-alkyl group, a hydrogen atom with a member selected form the group consisting of $\alpha$-hydroxyl group, $\alpha$-hydroxyl group esterified with lower aliphatic carboxylic acid and etherified with lower aliphatic alcohol, benzyl alcohol or tetrahydropyranol, and a methylene group, and $R_3$ represents a member selected from the group consisting of hydrogen, hydroxyl group, hydroxyl group esterified with lower aliphatic carboxylic acid and etherified with lower aliphatic alcohol, benzyl alcohol or tetrahydropyranol, 17$\alpha$-monoesters with lower aliphatic carboxylic acid and derivatives of 16,17-dihydroxy compounds with the following partial formula of the ring D

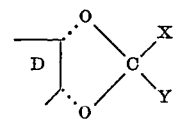

in which X and Y represents each a member selected from the group consisting of an unsubstituted hydrocarbon residue and a hydrocarbon substituted by a member selected from the group consisting of hydroxyl, acyloxy, free and esterified carboxyl groups.

26. A compound according to claim 25, which is the 21-acetate of 6$\beta$-iodo-3$\beta$,5$\alpha$,17$\alpha$,21-tetrahydroxy-20-oxo-pregnane.

27. A compound according to claim 25, which is the 21-acetate of 16$\alpha$-methyl-6$\beta$-iodo-3$\beta$,5$\alpha$,17$\alpha$,21-tetrahydroxy-20-oxopregnane.

28. A compound according to claim 25, which is 6$\beta$-iodo-3$\beta$,5$\alpha$,17$\alpha$-trihydroxy-20-oxopregnane.

29. A compound according to claim 25, which is 6$\beta$-iodo-16$\alpha$-methyl-3$\beta$,5$\alpha$,17$\alpha$-trihydroxy-20-oxopregnane.

30. A compound according to claim 25, which is 6$\beta$-iodo-3$\beta$,5$\alpha$-dihydroxy-17$\alpha$-acetoxy-20-oxopregnane.

31. A compound according to claim 25, which is the 16,17-acetonide of 6$\beta$-iodo-3$\beta$,5$\alpha$,16$\alpha$,17$\alpha$-tetrahydroxy-20-oxopregnane.

References Cited

FOREIGN PATENTS 916,996   1/1963   Great Britain _____ 260—397.45

ELBERT L. ROBERTS, Primary Examiner

U.S. Cl. X.R.

260—397.4; 397.45, 397.47

UNITED STATES PATENT OFFICE
CERTIFICATE OF CORRECTION

Patent No. 3,784,598          Dated January 8, 1974

Inventor(s) PERCY L. JULIAN ET AL

It is certified that error appears in the above-identified patent and that said Letters Patent are hereby corrected as shown below:

Column 1, lines 5 and 6, after "assignors to" delete "Ciba Corporation, Summit, N. J." and insert --CIBA-GEIGY Corporation, Ardsley, N. Y. --;

Column 10, line 44, after "$\Delta^4$-3-" insert -- oxo- --;

Column 12, line 10, in the formula delete "$=R_3$" and insert -- $=R_2$ --

Signed and sealed this 6th day of August 1974.

(SEAL)
Attest:

McCOY M. GIBSON, JR.          C. MARSHALL DANN
Attesting Officer              Commissioner of Patents